United States Patent
Yang et al.

(10) Patent No.: US 11,242,811 B2
(45) Date of Patent: Feb. 8, 2022

(54) SYSTEM FOR AUTOMATICALLY CONTROLLING SHUT-OFF OF VEHICLE AND METHOD THEREFOR

(71) Applicants: HYUNDAI MOTOR COMPANY, Seoul (KR); KIA MOTORS CORPORATION, Seoul (KR)

(72) Inventors: Dong Il Yang, Seoul (KR); Ji Woon Park, Seoul (KR); Beom Choon Park, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/789,036

(22) Filed: Feb. 12, 2020

(65) Prior Publication Data

US 2021/0033035 A1 Feb. 4, 2021

(30) Foreign Application Priority Data

Jul. 29, 2019 (KR) ........................ 10-2019-0091756

(51) Int. Cl.
| | |
|---|---|
| *F02D 17/04* | (2006.01) |
| *F02D 41/04* | (2006.01) |
| *F02D 41/08* | (2006.01) |
| *B60Q 9/00* | (2006.01) |
| *G06K 9/00* | (2006.01) |
| *B60W 40/08* | (2012.01) |

(52) U.S. Cl.
CPC ............. *F02D 41/042* (2013.01); *B60Q 9/00* (2013.01); *B60W 40/08* (2013.01); *F02D 41/08* (2013.01); *G06K 9/00832* (2013.01); *G06K 9/00838* (2013.01); *B60W 2040/0881* (2013.01); *F02D 2200/60* (2013.01)

(58) Field of Classification Search
CPC .. B60Q 9/00; B60W 2040/0881; F02D 17/04; F02D 41/042; F02D 41/08; F02D 2200/60; G06K 9/00832; G06K 9/00838
USPC ............ 701/112; 123/198 D, 198 DC, 179.2, 123/179.4
See application file for complete search history.

(56) References Cited

U.S. PATENT DOCUMENTS

| | | | |
|---|---|---|---|
| 10,371,112 B1* | 8/2019 | Khafagy | F02N 11/0818 |
| 10,550,817 B2* | 2/2020 | Okitsu | F02N 11/0822 |
| 10,829,003 B2* | 11/2020 | Thunga Gopal .. | B60W 30/1819 |
| 2013/0079952 A1* | 3/2013 | Fazi | F02D 45/00 701/2 |
| 2015/0267628 A1* | 9/2015 | Bohn | B60Q 3/20 701/112 |
| 2017/0253245 A1* | 9/2017 | Khafagy | B60W 10/182 |
| 2019/0039546 A1* | 2/2019 | Elangovan | G07C 9/0069 |

* cited by examiner

*Primary Examiner* — Erick R Solis
(74) *Attorney, Agent, or Firm* — Morgan, Lewis & Bockius LLP (57) ABSTRACT

A system for automatically controlling shut-off of a vehicle includes: a sensor that senses existence of a user in the vehicle; and a vehicle controlling device that determines whether the vehicle is in an idle state, determines whether a user exists in the vehicle based on a sensing value of the sensor, controls the vehicle to automatically shut off, and notifies a user of a vehicle state.

16 Claims, 11 Drawing Sheets

SYSTEM FOR AUTOMATICALLY CONTROLLING SHUT-OFF OF VEHICLE AND METHOD THEREFOR

CROSS-REFERENCE TO RELATED APPLICATION

This application claims the benefit of priority to Korean Patent Application No. 10-2019-0091756, filed in the Korean Intellectual Property Office on Jul. 29, 2019, the entire contents of which are incorporated herein by reference.

TECHNICAL FIELD

The present disclosure relates to a system for automatically controlling shut-off of a vehicle and a method therefor, and more particularly, relates to technologies of controlling a vehicle to automatically shut off.

BACKGROUND

To address problems such as occurrence of carbon monoxide from unintended vehicle idling, generation of unnecessary exhaust gas, deterioration in fuel efficiency, and the like, an auto shut-off function is applied to vehicles.

In the existing technology, such an auto shut-off function is to automatically turn off a power source of a vehicle after a certain time after a gearshift enters a parking (P)-state. However, even if a user does not want to perform the auto shut-off function, it is impossible to disable the auto shut-off function.

When the conventional auto shut-off function is applied, it is vulnerable to monitoring whether a user rides in the vehicle and undesirable auto shut-off occurs frequently in the state where the user rides in the vehicle.

Furthermore, because the existing technology does not provide a service for notifying a user outside the vehicle of the auto shut-off function, the user outside the vehicle does not know a vehicle state.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides a system for automatically controlling shut-off of a vehicle to control a vehicle to automatically shut off based on whether the vehicle is an idle state, whether the user rides in the vehicle, a user setting condition, or the like and notify the user of it and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system may include: a sensor configured to sense existence of a user in a vehicle; and a vehicle controlling device configured to determine whether the vehicle is in an idle state, determine whether a user exists in the vehicle based on a sensing value of the sensor, control the vehicle to automatically shut off, and notify the user of a vehicle state.

The vehicle controlling device may determine whether the vehicle in the idle state based on at least one or more of a gear stage, an engine state, or a vehicle speed.

The vehicle controlling device may determine whether the user exists in the vehicle based on image capture data of a camera or sensing data of a radar sensor.

The vehicle controlling device may run a timer, when the vehicle is in the idle state and when there is no the user in the vehicle.

The vehicle controlling device may receive and set a running time of the timer in advance from the user.

The vehicle controlling device may determine whether the vehicle departs from the idle state or the user exists in the vehicle, while the timer is running.

The vehicle controlling device may provide the user with at least one or more of a visual warning or an audible warning sound for informing the user that the vehicle will shut off after a running time of the timer, when the timer starts to run.

The vehicle controlling device may reset the timer and may count again, when a timer reset request is input from the user after the timer runs.

The vehicle controlling device may control the vehicle to shut off, when counting of the timer is completed.

The vehicle controlling device may notify the user that the shut-off of the vehicle is completed, after the shut-off of the vehicle is completed.

The vehicle controlling device may transmit the vehicle state to a device in the vehicle or a user terminal outside the vehicle.

The vehicle controlling device may determine whether there is a controller which is updating among controllers in the vehicle, when counting of the timer is completed, and may control the vehicle to shut off when there is no the controller which is updating.

The vehicle controlling device may shut off the vehicle after waiting until the update of the controller is ended, when there is the controller which is updating.

According to another aspect of the present disclosure, a vehicle system may include: a vehicle controlling device configured to determine whether a vehicle is in an idle state, determine whether a user exists in the vehicle based on vehicle information, control the vehicle to automatically shut off, and notify the user of a vehicle state; and a display controlled by the vehicle controlling device to display the vehicle state.

The vehicle controlling device may determine whether the user exists in the vehicle based on at least one or more of whether the user fastens a seat belt of a driver's seat, whether the user does not sit in a passenger seat, or opening of a door.

According to another aspect of the present disclosure, a method may include: determining whether a vehicle is in an idle state and whether a user exists in the vehicle; controlling the vehicle to automatically shut off, depending on whether the vehicle is in the idle state and whether the user exists in the vehicle; and notifying the user of a vehicle state as the vehicle is controlled to automatically shut off.

Whether the vehicle is in the idle state is determined based on at least one or more of a gear stage, an engine state, or a vehicle speed, and whether the user exists in the vehicle is determined based on image capture data of a camera or sensing data of a radar sensor.

Whether the vehicle is in the idle state is determined based on at least one or more of a gear stage, an engine state, or a vehicle speed, and whether the user exists in the vehicle is determined based on at least one or more of whether the user fastens a seat belt of a driver's seat, whether the user does not sit in a passenger seat, or opening of a door.

The controlling the vehicle to automatically shut off may include: running a timer, when the vehicle is in the idle state and when there is no the user in the vehicle; determining whether the vehicle departs from the idle state or whether the user exists in the vehicle, while the timer is running; and determining whether there is a controller which is updating among controllers in the vehicle, when counting of the timer is completed, and controlling the vehicle to shut off, when there is no the controller which is updating.

The notifying the user of the vehicle state may include providing the user with at least one or more of a visual warning or an audible warning sound for informing the user that the vehicle will shut off after a running time of the timer, when the timer starts to run.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An exemplary embodiment of the present disclosure discloses technologies of controlling a vehicle to shut off automatically upon idling of the vehicle a user does not want and providing the user with a warning and notification for the shut-off to prevent carbon monoxide poisoning caused by idling and reduce unnecessary fuel consumption.

Hereinafter, a description will be given in detail of exemplary embodiments of the present disclosure with reference to FIGS. 1A and 8.

Figure 1A:
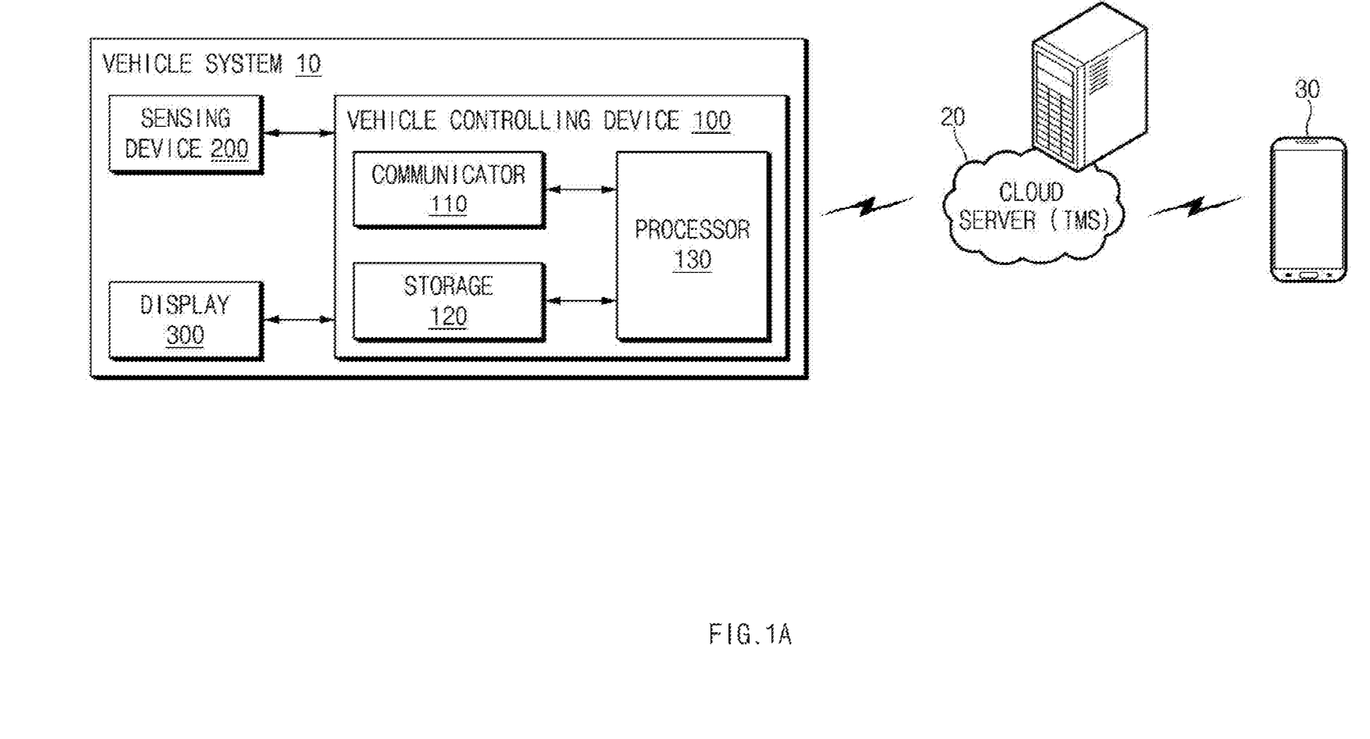
FIG. 1A is a block diagram illustrating a configuration of a vehicle system including a vehicle controlling device according to an exemplary embodiment of the present disclosure.
Figure 1B:
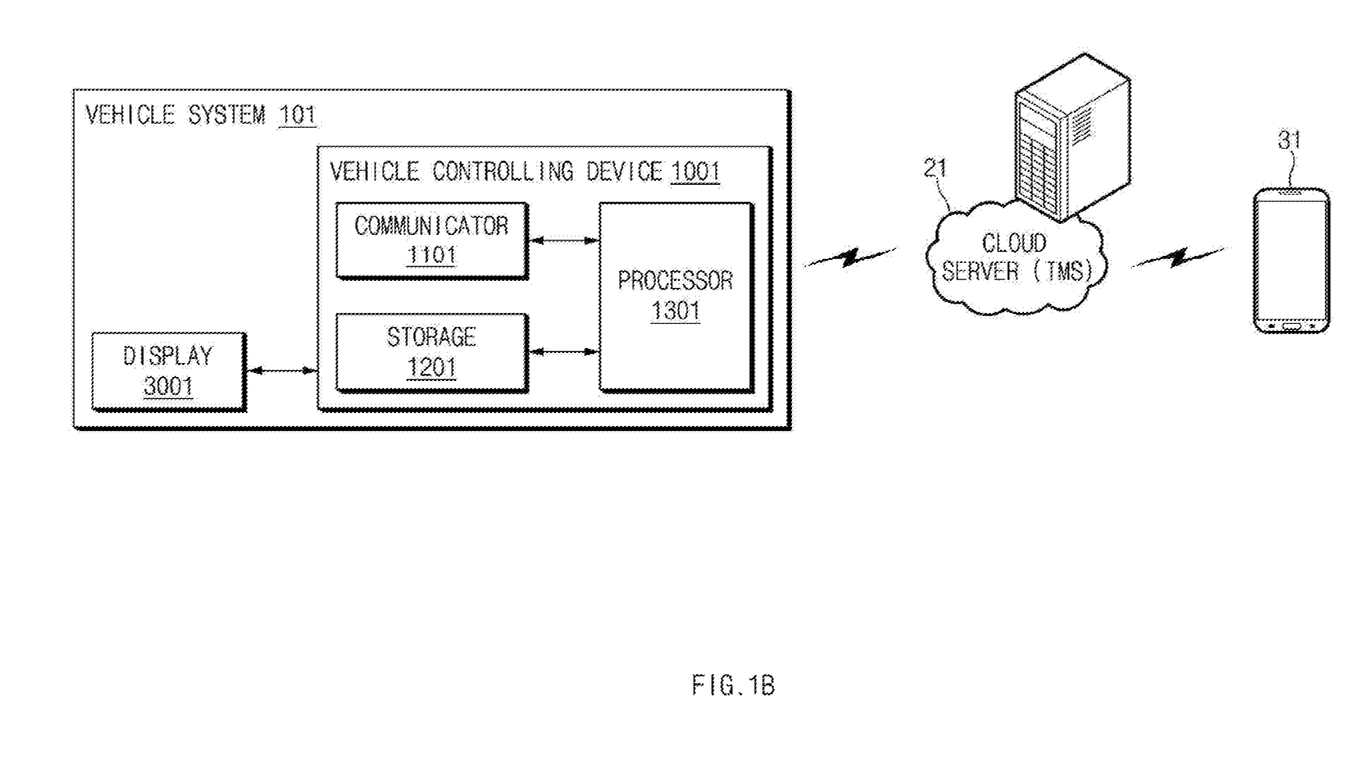
FIG. 1B is a block diagram illustrating a configuration of a vehicle system including a vehicle controlling device according to another exemplary embodiment of the present disclosure.
Figure 2:
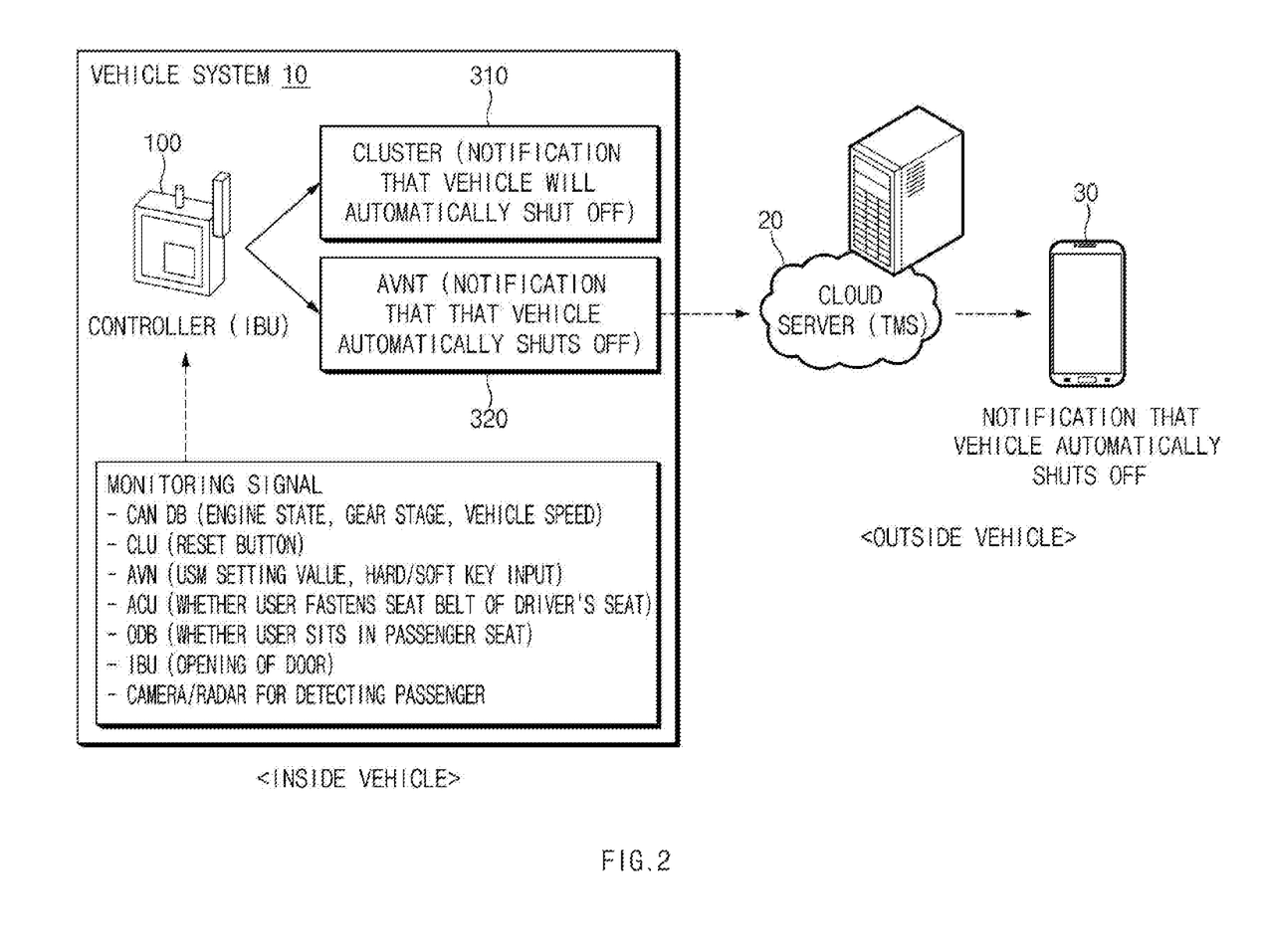
FIG. 2 is a drawing illustrating the entire system to which a vehicle controlling device is applied in a vehicle, according to an exemplary embodiment of the present disclosure.

FIG. 1A is a block diagram illustrating a configuration of a vehicle system including a vehicle controlling device according to an exemplary embodiment of the present disclosure. FIG. 1B is a block diagram illustrating a configuration of a vehicle system including a vehicle controlling device according to another exemplary embodiment of the present disclosure. FIG. 2 is a drawing illustrating the entire system to which a vehicle controlling device is applied in a vehicle, according to an exemplary embodiment of the present disclosure. In FIG. 1A, an exemplary embodiment of the present disclosure is exemplified as a vehicle system 10 includes a sensor 200, such as a camera or a radar sensor, and determines whether a user rides in a vehicle using information of the camera or the radar sensor. In FIG. 1B, an exemplary embodiment of the present disclosure is exemplified as a vehicle system 101 does not include a sensor, such as a camera or a radar sensor, for detecting a user in a vehicle and determines whether the user rides in the vehicle based on vehicle information (information such as information indicating whether the user fastens a seat belt of a driver's seat, information indicating whether the user does not sit in a passenger seat, or information associated with detecting opening of a door).

Referring to FIG. 1A, when controlling the vehicle to shut off, a vehicle controlling device 100 according to an exemplary embodiment of the present disclosure may provide a warning about shut-off or a notification that shut-off is completed to a user terminal 230 via a cloud server 20.

The cloud server 20 may be a telematics server (TMS), may collect a variety of information from the vehicle system 10 to form big data, and may provide information to the user terminal 30.

The user terminal 30 may be implemented as a computer or a portable terminal which may access the vehicle system 10 or the TMS 20 over a network. Herein, the computer may include, for example, a notebook, a desktop, a laptop, a tablet personal computer (PC), a slate PC, or the like into which a web browser is loaded. The portable terminal may be, for example, a wireless communication device in which portability and mobility are ensured and may include all types of handheld wireless communication devices, such as a personal communication system (PCS), a global system for mobile communications (GSM), a personal digital cellular (PDC), a personal handyphone system (PHS), a personal digital assistant (PDA), an international mobile telecommunication-2000 (IMT-2000) terminal, a code division multiple access (CDMA) terminal, a wideband-code division multiple access (W-CDMA) terminal, a wireless broadband Internet (WiBro) terminal, a smartphone, a tablet PC, a mobile phone, a video phone, an e-book reader, and a netbook computer, and a wearable device, such as a clock, a ring, a bracelet, an anklet, a necklace, glasses, contact lenses, or a head-mounted device (HMD). The portable terminal may include all devices, each of which may install a navigation application. A vehicle interaction application which interacts with a vehicle display device may be installed in the user terminal 30. The vehicle interaction application may be downloaded through wireless communication, the Internet, or the like or may be automatically installed after being downloaded.

The vehicle controlling device 100 may determine whether the vehicle is in an idle state and whether there is a user in the vehicle, may control the vehicle to automatically shut off, and may notify the user of a vehicle state.

As shown in FIG. 2, the vehicle controlling device 100 may be implemented as a vehicle power controller (e.g., an integrated body unit (IBU)) or the like. Furthermore, the vehicle controlling device 100 may display a screen for providing a notification that the vehicle will automatically shut off on a cluster 310 and may transmit a screen for providing a notification that auto shut-off of the vehicle is completed to audio video navigation telematics (AVNT) 320. The AVNT 320 may transmit information associated with a notification that auto shut-off of the vehicle is completed in the form of text or the like to the user terminal 30 via the cloud server 20.

The vehicle controlling device 100 may include a communicator 110, a storage 120, and a processor 130.

The communicator 110 may be a hardware device implemented with various electronic circuits to transmit and receive a signal through a wireless or wired connection. In an exemplary embodiment of the present disclosure, the communicator 110 may perform inter-vehicle communication through controller area network (CAN) communication, local interconnect network (LIN) communication, Ethernet communication, or the like and may include various communication units, for example, a mobile communication unit, a broadcast receiving unit, such as a digital multimedia broadcasting (DMB) module or a digital video broadcasting-handheld (DVB-H) module, a short-range communication unit, such as a ZigBee module a near field communication (NFC) module which is a Bluetooth module, and a wireless-fidelity (Wi-Fi) unit, for communication with the cloud server 20 or the like outside the vehicle.

The storage 120 may store a sensing result of the sensor 200, CAN communication data received from devices (e.g., a cluster (CLU), an audio video navigation (AVN), an airbag control unit (ACU), on-board diagnostics (ODB), an integrated body unit (IBU), and the like) in the vehicle for CAN communication, information indicating whether the vehicle is in an idle state, obtained by the processor 130, the result of determining whether there is a user in the vehicle, a user setting value, or the like. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be electrically connected with the communicator 110, the storage 120, or the like and may electrically control the respective components. The processor 130 may be an electrical circuit which executes instructions of software and may perform a variety of data processing and calculation described below.

The processor 130 may determine whether the vehicle is in an idle state and whether there is a user in the vehicle to control the vehicle to automatically shut off and may notify the user of a vehicle state.

The processor 130 may determine whether the vehicle is in the idle state based on at least one or more of a gear stage, an engine state, and/or a vehicle speed. In other words, when a gearshift is in the P-range, when an ignition is on, or when the vehicle is stopped, the processor 130 may determine that the vehicle is in the idle state.

The processor 130 may determine whether there is the user in the vehicle, based on image capture data of the camera or sensing data of the radar sensor.

When the vehicle is in the idle state and when there is no user in the vehicle, the processor 130 may run a timer. The processor 130 may receive and set a running time of timer in advance from the user.

While the timer is running, the processor 130 may determine whether the vehicle departs from the idle state or when there is the user in the vehicle.

When the timer starts to run, the processor 130 may provide the user with at least one or more of a screen (a warning screen) and/or an audible warning sound for informing the user that the vehicle will shut off after the running time of the timer.

When a timer reset request is input from the user after the timer runs, the processor 130 may reset the timer and may count again.

When the counting of the timer is completed, the processor 130 may control the vehicle to shut off.

After the shut-off of the vehicle is completed, the processor 130 may notify the user that the shut-off of the vehicle is completed.

The processor 130 may transmit a vehicle state to a device, for example, a cluster, HUD, etc., in the vehicle or the user terminal 30 outside the vehicle.

When the counting of the timer is completed, the processor 130 may determine whether there is a controller which is updating software among controllers in the vehicle. When there is no controller which is updating, the processor 130 may control the vehicle to shut off.

When there is the controller which is updating, the processor 130 may shut off the vehicle after waiting until the update of the controller is ended.

The sensor 200 may include at least one or more sensors for detecting whether the user rides in the vehicle. To this end, the sensor 200 may include a camera for capturing an image of the interior of the vehicle, a radar sensor for sensing a passenger in the vehicle, a seat belt sensor for sensing whether the user fastens his or her seat belt, a door sensor for sensing opening of a door, a weight sensor for sensing whether the user sits in the passenger seat, or the like.

A display 300 may be controlled by the processor 130 to display a screen indicating a vehicle state, such as a shut-off warning or shut-off completion. The display 300 may be implemented as a head-up display (HUD), a cluster, an audio video navigation (AVN), an audio video navigation on telematics (AVNT), or the like. The display 300 may be provided as a touchscreen including a touch panel to be used as an input device other than an output device. The display 300 may display a reset button or the like for resetting a timer. When the timer reset button is touched by the user, the processor 130 may provide a notification that the timer reset button is touched. Furthermore, the display 300 may receive a setting value for auto shut-off through a user setting mode (USM) configuration menu and may receive a timer running time or the like which is preset by the user.

Moreover, the display 300 may include at least one of liquid crystal display (LCD), a thin film transistor-LCD (TFT-LCD), emitting diode (LED) display, an organic LED (OLED) display, an active matrix OLED (AMOLED) display, a flexible display, a bended display, or a three-dimensional (3D) display. Some thereof may be implemented as transparent displays configured as a transparent type or a semi-transparent type to see the outside.

When controlling the vehicle to shut off, the vehicle controlling device 1001 according to another embodiment of the present disclosure in FIG. 1B may provide a shut-off warning or a notification that shut-off is completed to a user terminal 31 via a cloud server 21.

A communicator 1101, a storage 1201, and a processor 1301 of the vehicle controlling device 1001 of FIG. 1B may be the same in function as the communicator 110, the storage 120, the processor 130, and the display 300 of the vehicle controlling device 100 of FIG. 1A. However, the processor 130 of the vehicle controlling device 100 of FIG. 1A may determine that the user rides in the vehicle based on the camera or the radar sensor, and the processor 1301 of the vehicle controlling device 1001 of FIG. 1B may determine whether there is the user in the vehicle based on at least one or more of whether the user fastens a seat belt of the driver's seat, whether the user does not sit the passenger seat, and/or opening of a door, which is indirect information in the vehicle rather than the camera or the radar sensor. Furthermore, the vehicle controlling device 1001 may be implemented as the vehicle power controller (e.g., the IBU) as shown in FIG. 2.

When the vehicle is in an idle state and when the user does not ride in the vehicle, an exemplary embodiment of the present disclosure may automatically shut off the vehicle after a predetermined time, thus preventing, carbon monoxide poisoning caused by idling and reducing unnecessary fuel consumption. An exemplary embodiment of the present disclosure may notify the user that the vehicle will automatically shut off and that the shut-off the vehicle is completed such that the user recognizes it.

Moreover, an exemplary embodiment of the present disclosure may consider a manner which checks a user manipulation such as a USM setting or an input of a reset button of a cluster and a manner which monitors direct/indirect sensing of the user in an overall manner and may determine an intention of the user to want to maintain starting, thus reducing claims and implementing a function in which safety is ensured.

Figure 3:
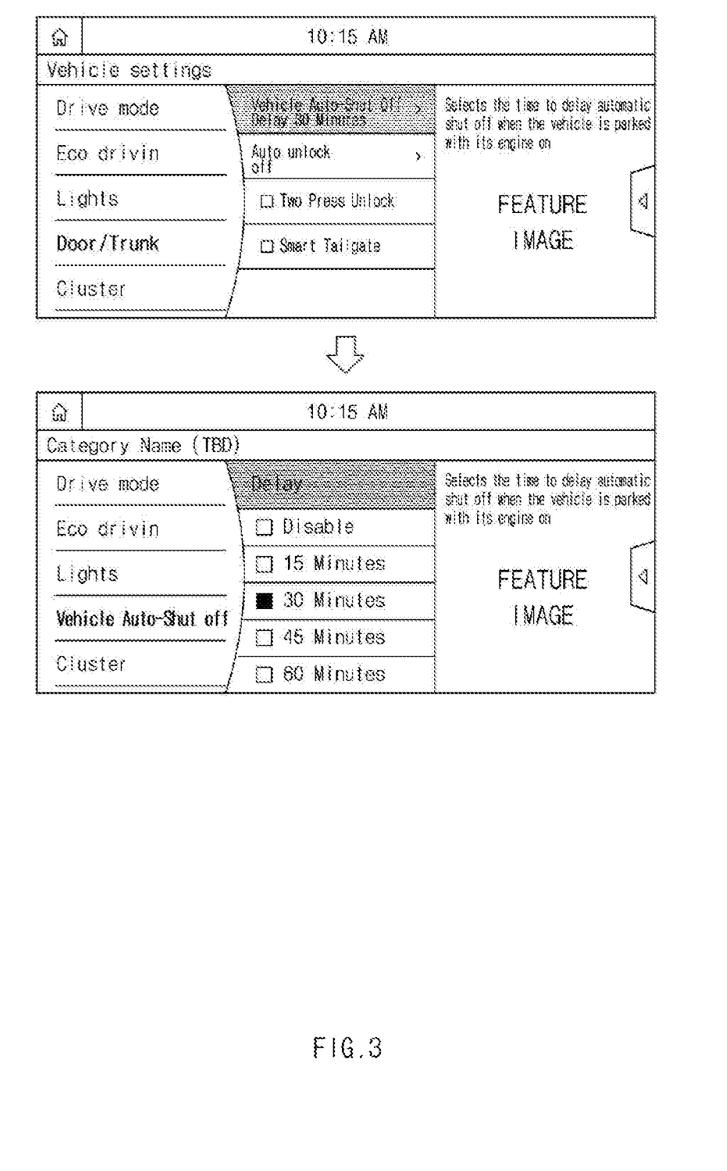
FIG. 3 is a drawing illustrating an exemplary screen of a user setting condition of a vehicle controlling device according to an exemplary embodiment of the present disclosure.

FIG. 3 is a drawing illustrating an exemplary screen of a user setting condition of a vehicle controlling device according to an exemplary embodiment of the present disclosure. Reference numeral 301 of FIG. 3, when a vehicle auto shut-off menu is selected from a USM setting menu, as shown in reference numeral 302, a timer running time selection menu for delay may be displayed. When a user selects 30 minutes, a timer is run during 30 minutes when a shut-off condition is met (when a vehicle is in an idle state or when there is no passenger in the vehicle) and auto shut-off of the vehicle progresses. As such, a vehicle controlling device 100 of FIG. 1A may implement a function (e.g., a disable function, a shut-off timer time, or the like) according to user settings.

Figure 4:
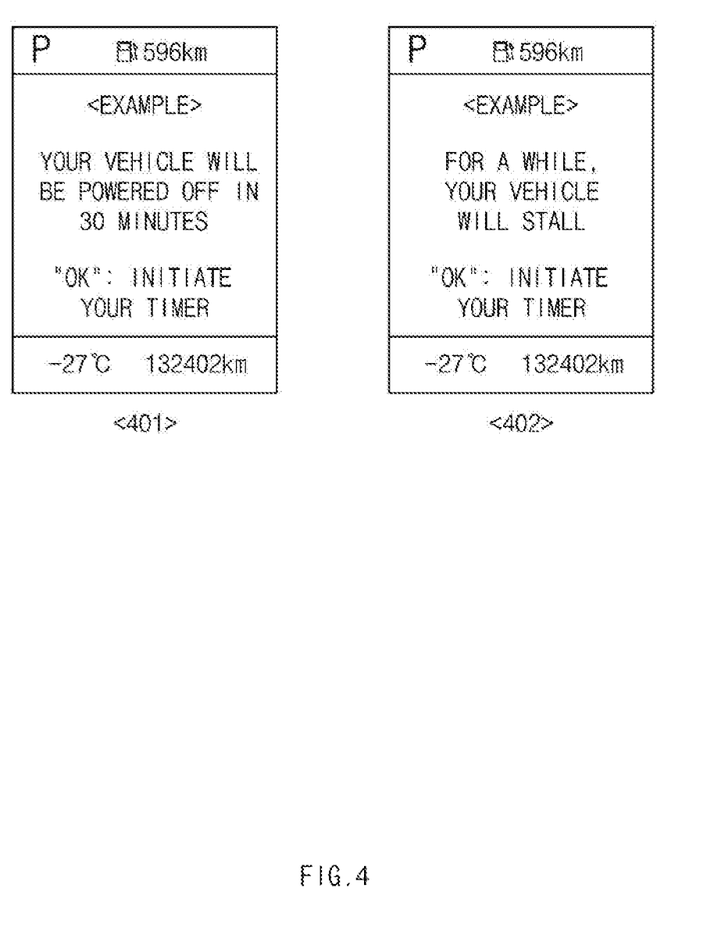
FIG. 4 is a drawing illustrating an exemplary screen for a notification that a vehicle controlling device will shut off in a vehicle control device, according to an exemplary embodiment of the present disclosure.

FIG. 4 is a drawing illustrating an exemplary screen for a notification that a vehicle controlling device will shut off in a vehicle control device, according to an exemplary embodiment of the present disclosure. A vehicle controlling device 100 of FIG. 1A may inform a user that a vehicle shuts off at a time when a timer is completed as shown in reference numeral 401 of FIG. 4 and may inform the user in advance that the vehicle will shut off for a while as shown in reference numeral 402, such that the user may recognize in advance that the vehicle will shut off for a while.

Figure 5:
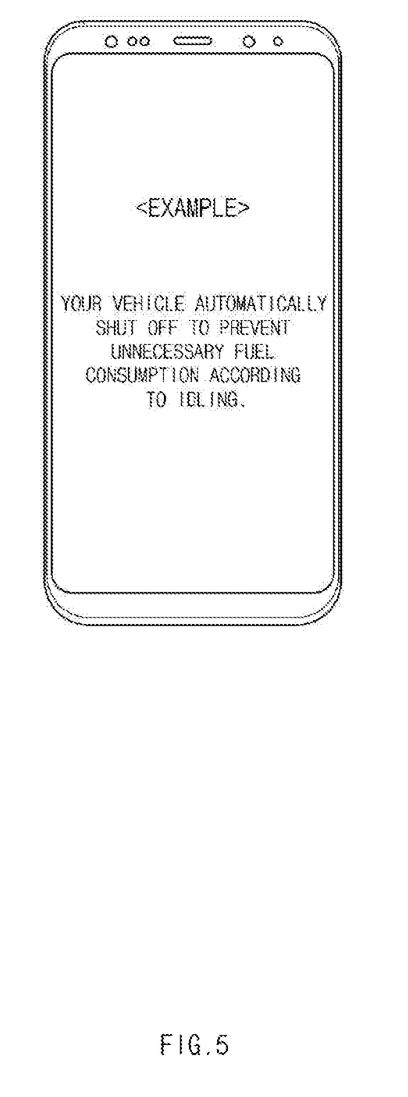
FIG. 5 is a drawing illustrating an exemplary screen for a notification that shut-off of a vehicle is completed a vehicle control device, according to an exemplary embodiment of the present disclosure.

FIG. 5 is a drawing illustrating an exemplary screen for a notification that shut-off of a vehicle is completed in a vehicle control device, according to an exemplary embodiment of the present disclosure. Referring to FIG. 5, it may be seen that completion of shut-off is displayed on a screen of a user terminal. As such, the result of performing auto shut-off may be displayed on the user terminal, such that a user outside a vehicle may recognize it.

As such, a vehicle controlling device 100 of FIG. 1A may notify a user terminal outside the vehicle of a shut-off state through a cloud server 20 outside the vehicle as well as a cluster which is a device in the vehicle, such that a user outside the vehicle as well as a user who rides in the vehicle may recognize that the vehicle will shut off or that the shut-off of the vehicle is completed.

Figure 6A:
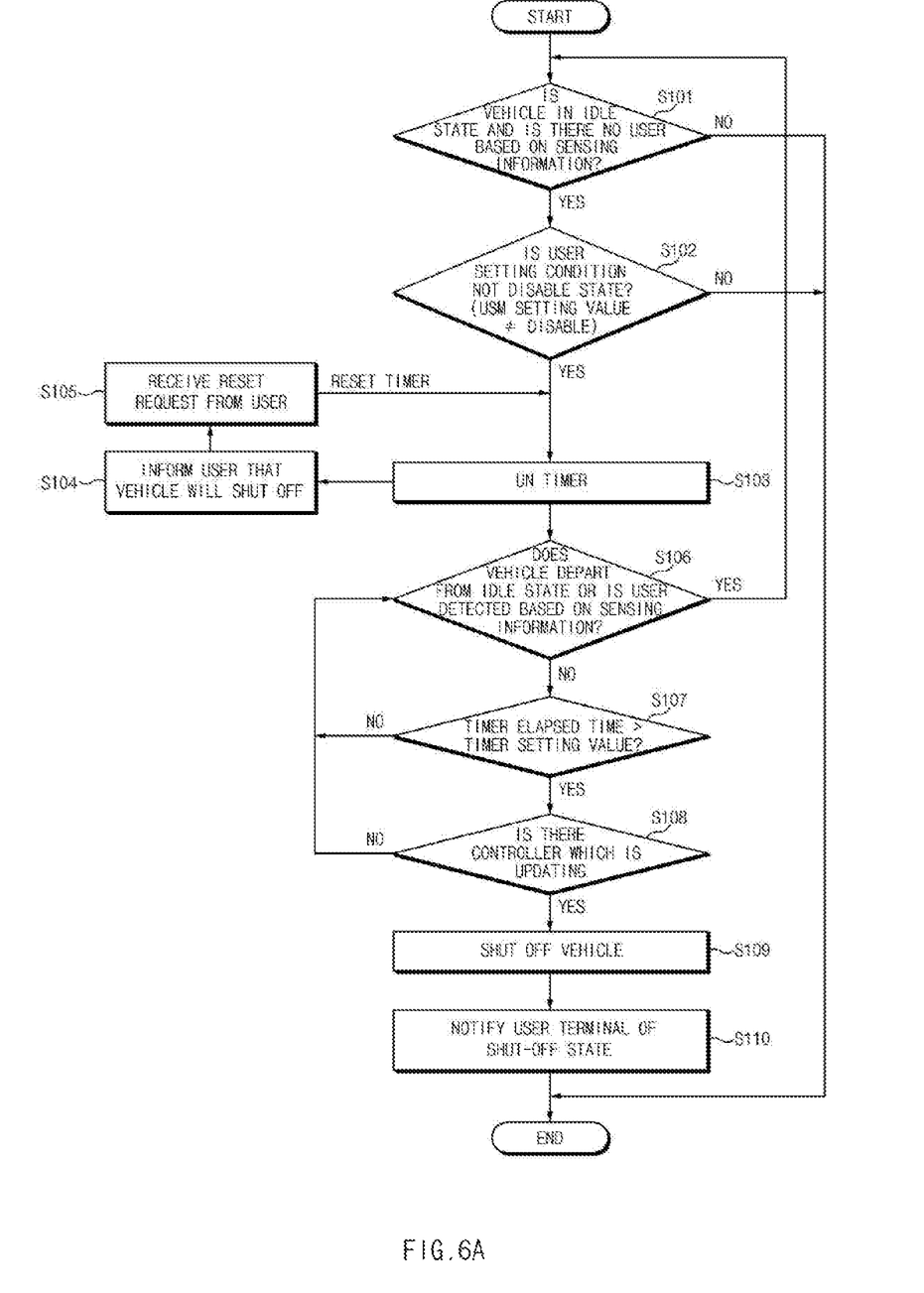
FIG. 6A is a flowchart illustrating a vehicle control method with regard to sensor information of a vehicle controlling device and an update of a controller according to an exemplary embodiment of the present disclosure.

Hereinafter, a description will be given in detail of a shut-off control and notification method for a vehicle with regard to sensor information and an update of a controller according to an ary embodiment of the present disclosure. FIG. 6A is a flowchart illustrating a shut-off control and notification method for a vehicle with regard to sensor information and an update of a controller according to an exemplary embodiment of the present disclosure.

Hereinafter, it is assumed that a vehicle controlling device 100 of FIG. 1A performs a process of FIG. 6A. Furthermore, in a description of FIG. 6A, an operation described as being performed by an apparatus may be understood as being controlled by a processor 130 of the vehicle controlling device 100.

Referring to FIG. 6A, in S101, the apparatus may determine whether a vehicle is in an idle state or whether there is no user based on sensing information to determine a shut-off entry condition. In this case, the sensing information may include a result sensed by a sensor 200 in the vehicle, such as a camera or a radar sensor. In other words, the apparatus may determine whether there is a user in the vehicle using data of the camera or the radar sensor. Furthermore, the apparatus may determine whether the vehicle is in the idle state, on the basis of a condition where a gearshift is in the P-range, where an ignition is on, or where the vehicle is stopped. When the vehicle is in the idle state or when there is no user, in S102, the vehicle controlling device 100 may determine whether a user setting condition is a disable state.

When the user sets a shut-off function to a disable state, the apparatus may end the process without performing a timer operation for performing the shut-off function. When the user does not set the shut-off function to the disable state (when a USB setting value≠ disable), the apparatus may continue performing the shut-off function.

Thus, in S103, the apparatus may run a timer to start to count. As shown in FIG. 4, when the counting is completed, in S104, the apparatus may inform (warn) the user that the vehicle will shut off. When a reset request is received from the user (when a reset button is on) in S105, the apparatus may reset the timer and may count again. In this case, when informing the user that the vehicle will shut off, the apparatus may inform the user of a running time of the timer. The running time of the timer may be set by the user or may be set to a USM setting value of an AVN, a cluster, or the like.

For example, the apparatus may display the sentence "Your vehicle will be powered off in 30 minutes. ("OK": initiate your timer)" on a display, such as a cluster or an AVN, or a user terminal and may display a shut-off warning message every minute until the vehicle shuts off. As shown in reference numeral 402 of FIG. 4, the apparatus may output an audible warning sound together with the warning sentence "After a while, your vehicle will stall".

After the timer is run, in S106, the apparatus may determine whether the vehicle departs from the idle state based on vehicle state information while the timer is running or may determine whether the state there is no user is being maintained based on sensing information while the timer is running. The apparatus may determine whether the vehicle departs from the idle state on the basis of a state where the vehicle is not stopped, a state where a gear is shifted (e.g., a state where a gearshift is not in the P-range), or the like and may determine whether there is the user based on a monitoring result of a camera or a radar sensor.

When the vehicle is in the idle state or when the state where there is no user is being maintained, in S107, the apparatus may determine whether a timer elapsed time is greater than a predetermined timer setting value. When the timer elapsed time is greater than the timer setting value (when the timer elapses), in S108, the apparatus may determine whether there is a controller which is currently updating.

When there is the controller which is updating, the apparatus may fail to shut off the vehicle. When there is no controller which is updating, in S109, the apparatus may perform shut-off of the vehicle, in which the vehicle is powered off. In other words, when there is the controller which is updating, the apparatus may waits until the update of the controller which is updating is ended.

In S110, the apparatus may transmit information indicating that the vehicle shuts off to a user terminal or a device in the vehicle.

In this case, the apparatus may provide a notification that auto shut-off is performed, through an AVN or the like. For example, the apparatus may transmit the guidance sentence "Your vehicle automatically shuts off to prevent idling." to the user terminal.

Figure 6B:
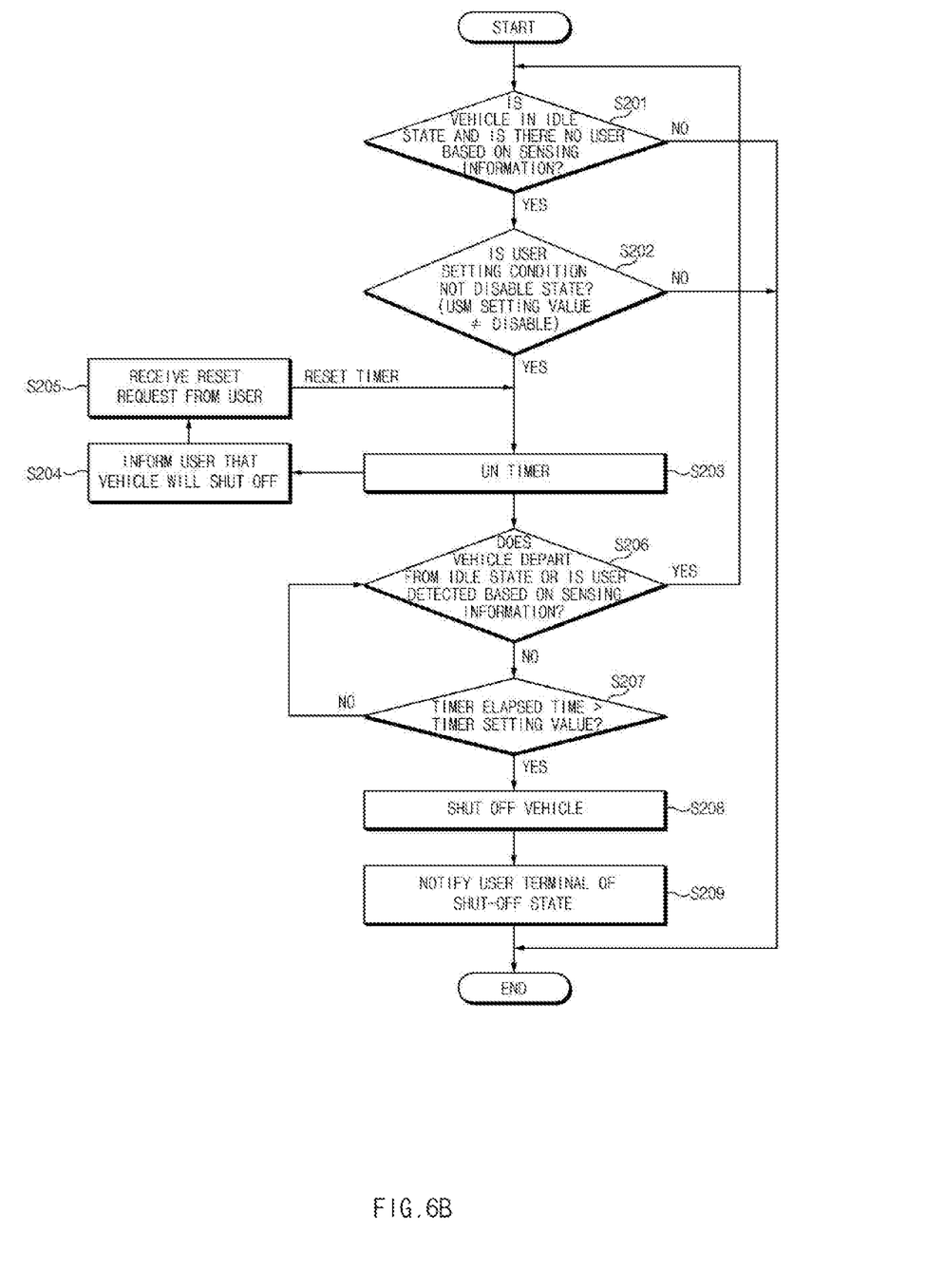
FIG. 6B is a flowchart illustrating a vehicle control method without regard to sensor information of a vehicle controlling device and an update of a controller according to an exemplary embodiment of the present disclosure.

Hereinafter, a description will be given in detail of a vehicle control method without regard to sensor information of a vehicle controlling device and an update of a controller according to an exemplary embodiment of the present disclosure. FIG. 6B is a flowchart illustrating a vehicle control method without regard to sensor information of a vehicle controlling device and an update of a controller according to an exemplary embodiment of the present disclosure.

Hereinafter, it is assumed that a vehicle controlling device 100 of FIG. 1A performs a process of FIG. 6B. Furthermore, in a description of FIG. 6B, an operation described as being performed by an apparatus may be understood as being controlled by a processor 130 of the vehicle controlling device 100. S201 to S207 in the vehicle control method according to an exemplary embodiment of the present disclosure of FIG. 6B are the same as S101 to S107 of FIG. 6A, respectively, a detailed description thereof will be omitted.

Herein, in FIG. 6B, when the counting of the timer elapses in S207, in S208, the apparatus may immediately shut off the vehicle without regard to whether there is a controller which is updating. In S209, the apparatus may notify a user terminal 30 of FIG. 1A of a shut-off state.

Figure 7A:
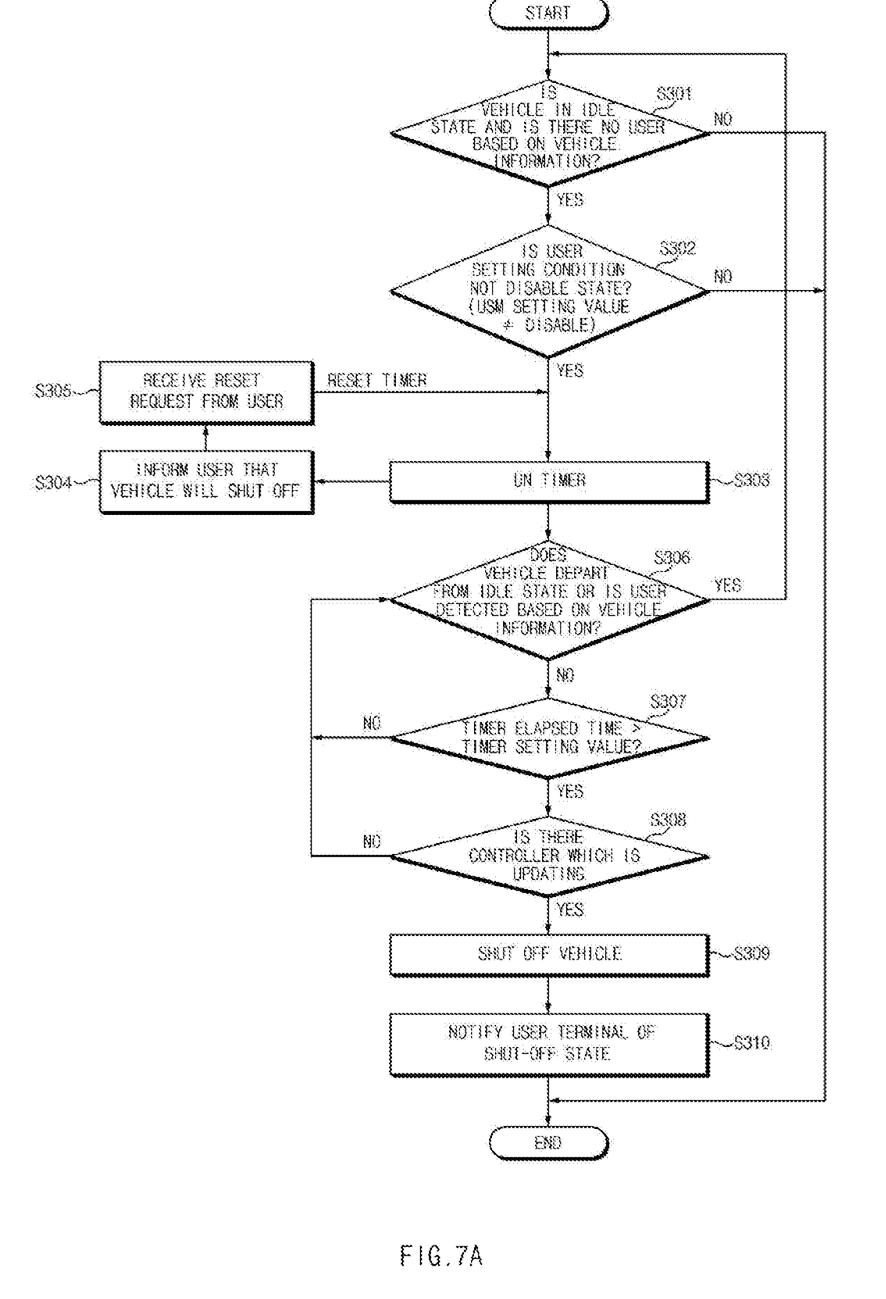
FIG. 7A is a flowchart illustrating a vehicle control method with regard to vehicle information of a vehicle controlling device and an update of a controller according to another exemplary embodiment of the present disclosure.

Hereinafter, a description will be given in detail of a vehicle control method with regard to vehicle information of a vehicle controlling device and an update of a controller according to another embodiment of the present disclosure. FIG. 7A is a flowchart illustrating a vehicle control method with regard to vehicle information of a vehicle controlling device and an update of a controller according to another embodiment of the present disclosure.

Hereinafter, it is assumed that a vehicle controlling device 1001 of FIG. 1B performs a process of FIG. 7A. Furthermore, in a description of FIG. 7A, an operation described as being performed by an apparatus may be understood as being controlled by a processor 1301 of the vehicle controlling device 1001.

Referring to FIG. 7A, in S101, the apparatus may determine whether a vehicle is an idle state and may determine whether there is no user based on vehicle information to determine a shut-off entry condition. In this case, the vehicle information may include at least one or more of whether a user fastens a seat belt of the driver's seat, whether the user does not sit in the passenger seat, and/or opening of a door. The apparatus may receive information indicating whether the user fastens the seat belt of the driver's seat, information indicating whether the user sits in the passenger seat, door sensing information, or the like from a device in the vehicle or may use a result value sensed by a seat belt sensor, a weight sensor, a door sensor, or the like. When the vehicle is in the idle state and when there is no user in the vehicle, the apparatus may perform S302 to S305. Because S302 to S305 are the same as S102 to S105 of FIG. 6A, a detailed description thereof will be omitted. In S306, the apparatus may determine whether the vehicle departs from the idle state based on vehicle state information or may determine whether there is the user based on vehicle information. In this case, the apparatus may determine whether the vehicle departs from the idle state on the basis of a state where the vehicle is not stopped, a state where a gear is shifted (e.g., a gearshift is not in the P-range), or the like. The apparatus may determine whether there is the user in the vehicle based on information, for example, whether a brake or accelerator pedal operates, whether any button (a hard/soft key) in the vehicle operates, or whether the user fastens a seat belt of the driver's seat.

Thus, when the vehicle is in the idle state and when the state where there is no user continues being maintained, the apparatus may perform S307 to S310. Because S307 to S310 are the same as S107 to S110 of FIG. 6A, respectively, a detailed description thereof will be omitted.

Figure 7B:
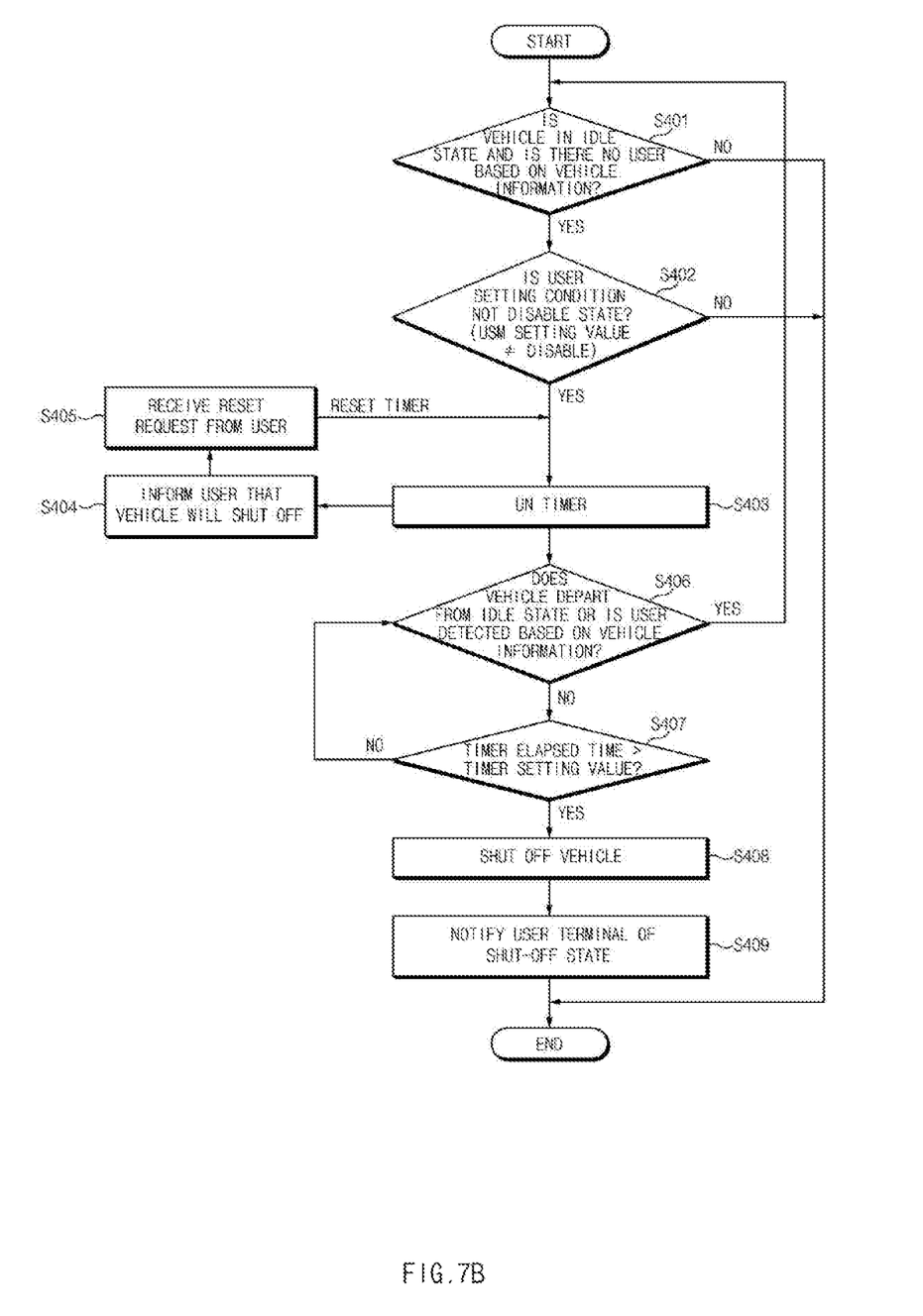
FIG. 7B is a flowchart illustrating a vehicle control method without regard to vehicle information of a vehicle controlling device and an update of a controller according to another exemplary embodiment of the present disclosure.

FIG. 7B is a flowchart illustrating a vehicle control method without regard to vehicle information of a vehicle controlling device and an update of a controller according to another exemplary embodiment of the present disclosure.

Hereinafter, it is assumed that a vehicle controlling device 1001 of FIG. 1B performs a process of FIG. 7B. Furthermore, in a description of FIG. 7B, an operation described as being performed by an apparatus may be understood as being controlled by a processor 1301 of the vehicle controlling device 1001.

Because S401 to S407 in the vehicle control method according to another embodiment of the present disclosure are the same as S301 to S307 of FIG. 7A, respectively, a detailed description thereof will be omitted.

Herein, when the counting of the timer elapses in S407 of FIG. 7B, in S408, the apparatus may immediately shut off a vehicle without regard to whether there is a controller which is updating. In S409, the apparatus may notify a user terminal 31 of FIG. 1B of a shut-off state.

As such, an ezemplary embodiment of the present disclosure may detect whether the vehicle is in the idle state and whether there is the user in the vehicle and may shut off the vehicle to prevent a carbon monoxide poisoning accident according to unintended vehicle idling, thus reducing an additional safety accident, reducing unnecessary exhaust gas, and enhancing fuel efficiency according to it.

Furthermore, an exemplary embodiment of the present disclosure may automatically shut off the vehicle at a desired time and may disable the auto shut-off function when undesirable, by operating a function according to user settings, thus increasing satisfaction of the user.

Furthermore, an exemplary embodiment of the present disclosure may monitor whether the user rides in the vehicle and may prevent auto-shut off the user does not want, such that the user may clearly recognize the operation of a function through a cluster notification (a visual notification/ an audible notification), and may extend a shut-off time by resetting the timer, thus increasing convenience of the user.

Furthermore, an exemplary embodiment of the present disclosure may notify the user outside the vehicle of a vehicle state by providing a starting state notification through the TMS, thus ensuring that the user recognizes the vehicle state in the outside of the vehicle.

The vehicle controlling device 100 according to an exemplary embodiment of the present disclosure is applicable to all of an internal combustion engine vehicle, a plug-in hybrid electric vehicle (PHEV), a hybrid electric vehicle (HEV), an electric vehicle (EV), and an internal combustion engine (ICE).

Figure 8:
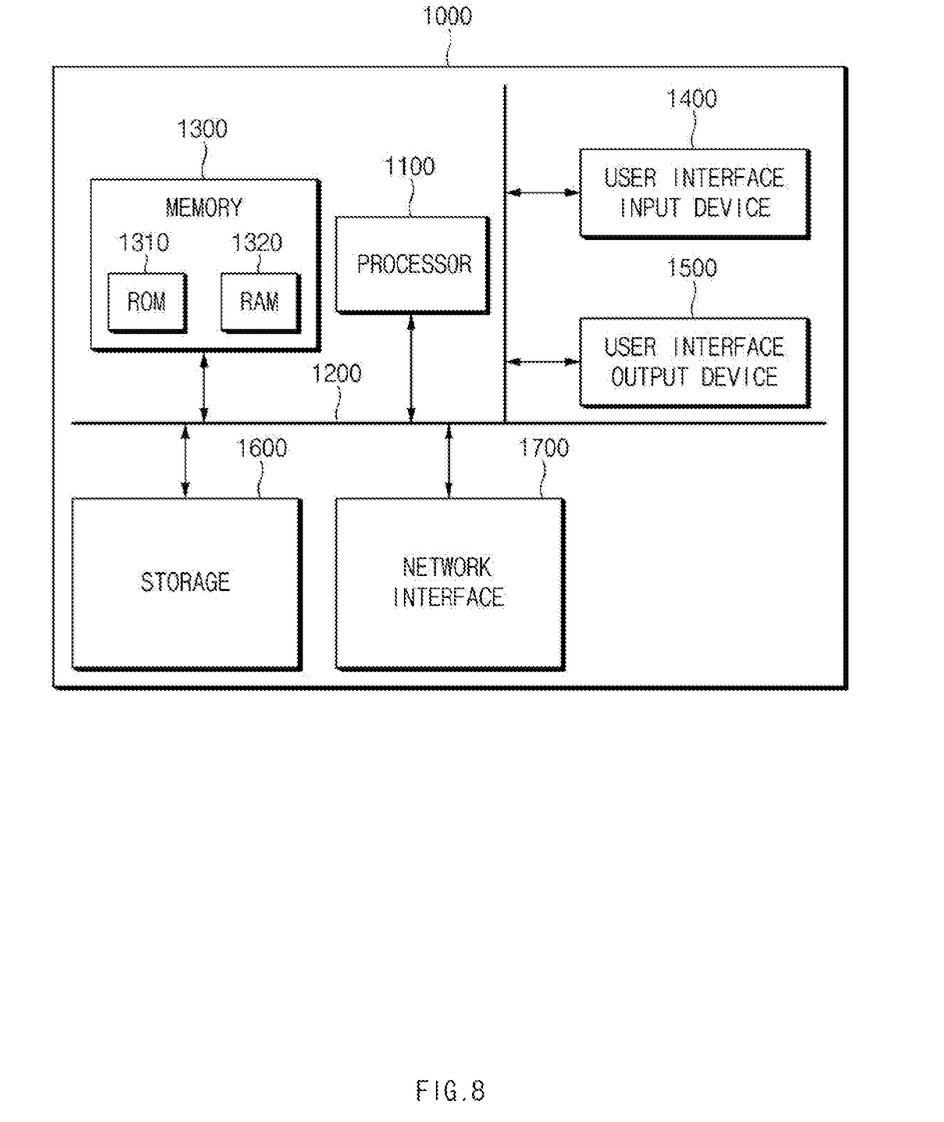
FIG. 8 is a block diagram illustrating a computing system according to an exemplary embodiment of the present disclosure.

FIG. 8 is a block diagram illustrating a computing system according to an exemplary embodiment of the present disclosure.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

The operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may control the vehicle to automatically shut off based on whether the vehicle is the idle state, whether the user rides in the vehicle, a user setting condition, or the like to prevent unnecessary idling, thus preventing carbon monoxide poisoning and reducing unnecessary fuel consumption.

Furthermore, the present technology may notify the user of information associated with a state where the vehicle will shut off and a state where the shut-off the vehicle is completed, such that the user may accurately recognize the vehicle state.

In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A system, comprising:
   a sensor configured to sense existence of a user in a vehicle; and
   a vehicle controlling device configured to:
     determine whether the vehicle is in an idle state,
     determine whether the user exists in the vehicle based on a sensing value of the sensor,
     control the vehicle to automatically shut off,
     notify the user of a vehicle state,
     when the vehicle is in the idle state and when there is no user in the vehicle, run a timer, and
     when the timer starts to run, provide periodically for every predetermined time at least one or more of a visual warning or an audible warning for informing the user that the vehicle will shut off after a running time of the timer, wherein the vehicle controlling device determines whether there is a controller which is updating software among controllers in the vehicle, when counting of the timer is completed, and controls the vehicle to shut off when there is no the controller which is updating.

2. The system of claim 1, wherein the vehicle controlling device determines whether the vehicle in the idle state based on at least one or more of a gear stage, an engine state, or a vehicle speed.

3. The system of claim 1, wherein the vehicle controlling device determines whether the user exists in the vehicle based on image capture data of a camera or sensing data of a radar sensor.

4. The system of claim 1, wherein the vehicle controlling device receives and sets a running time of the timer in advance from the user.

5. The system of claim 1, wherein the vehicle controlling device determines whether the vehicle departs from the idle state or the user exists in the vehicle, while the timer is running.

6. The system of claim 1, wherein the vehicle controlling device resets the timer and counts again, when a timer reset request is input from the user after the timer runs.

7. The system of claim 1, wherein the vehicle controlling device controls the vehicle to shut off, when counting of the timer is completed.

8. The system of claim 7, wherein the vehicle controlling device notifies the user that the shut-off of the vehicle is completed, after the shut-off of the vehicle is completed.

9. The system of claim 1, wherein the vehicle controlling device transmits the vehicle state to a device in the vehicle or a user terminal outside the vehicle.

10. The system of claim 1, wherein, when there is the controller which is updating, the vehicle controlling device shuts off the vehicle after the update of the controller ends.

11. A system, comprising:
a vehicle controlling device configured to:
  determine whether a vehicle is in an idle state,
  determine whether a user exists in the vehicle based on vehicle information,
  control the vehicle to automatically shut off,
  notify the user of a vehicle state,
  when the vehicle is in the idle state and when there is no the user in the vehicle, run a timer, and
  when the timer starts to run, provide periodically for every predetermined time at least one or more of a visual warning or an audible warning for informing the user that the vehicle will shut off after a running time of the timer; and
a display configured to be controlled by the vehicle controlling device and display the vehicle state,
wherein the vehicle controlling device determines whether there is a controller which is updating software among controllers in the vehicle, when counting of the timer is completed, and controls the vehicle to shut off when there is no the controller which is updating.

12. The system of claim 11, wherein the vehicle controlling device determines whether the user exists in the vehicle based on at least one or more of whether the user fastens a seat belt of a driver's seat, whether the user does not sit in a passenger seat, or opening of a door.

13. A method for automatically controlling shut-off of a vehicle, the method comprising:
determining whether the vehicle is in an idle state and whether a user exists in the vehicle;
controlling the vehicle to automatically shut off, depending on whether the vehicle is in the idle state and whether the user exists in the vehicle; and
notifying the user of a vehicle state as the vehicle is controlled to automatically shut off,
wherein the controlling the vehicle includes running, when the vehicle is in the idle state and when there is no user in the vehicle, a timer,
wherein the notifying the user includes generating, when the timer starts to run, at least one or more of a visual warning or an audible warning for informing the user that the vehicle will shut off after a running time of the timer, and
wherein the controlling the vehicle to automatically shut off further includes:
  determining whether there is a controller which is updating among controllers in the vehicle, when counting of the timer is completed, and controlling the vehicle to shut off, when there is no the controller which is updating.

14. The method of claim 13, wherein in the determining whether the vehicle is in the idle state and whether a user exists in the vehicle,
whether the vehicle is in the idle state is determined based on at least one or more of a gear stage, an engine state, or a vehicle speed, and
whether the user exists in the vehicle is determined based on image capture data of a camera or sensing data of a radar sensor.

15. The method of claim 13, wherein in the determining whether the vehicle is in the idle state and whether a user exists in the vehicle, whether the vehicle is in the idle state is determined based on at least one or more of a gear stage, an engine state, or a vehicle speed, and
whether the user exists in the vehicle is determined based on at least one or more of whether the user fastens a seat belt of a driver's seat, whether the user does not sit in a passenger seat, or opening of a door.

16. The method of claim 13, wherein the controlling the vehicle further includes:
determining whether the vehicle departs from the idle state or whether the user exists in the vehicle, while the timer is running.

* * * * *